United States Patent [19]
Bengtsson

[11] Patent Number: 5,622,420
[45] Date of Patent: Apr. 22, 1997

[54] STORAGE AND PROJECTION POCKET FOR OVERHEAD TRANSPARENCIES

[75] Inventor: Raymond Bengtsson, Täby, Sweden

[73] Assignee: Plastus Kreativ AB, Upplands Väsby, Sweden

[21] Appl. No.: 416,800

[22] PCT Filed: Oct. 11, 1993

[86] PCT No.: PCT/SE93/00823

§ 371 Date: Apr. 12, 1995

§ 102(e) Date: Apr. 12, 1995

[87] PCT Pub. No.: WO94/09406

PCT Pub. Date: Apr. 28, 1994

[30] Foreign Application Priority Data

Oct. 14, 1992 [SE] Sweden ................................. 9203019

[51] Int. Cl.$^6$ .................................................. G03B 21/14
[52] U.S. Cl. ................................................. 353/120; 40/701
[58] Field of Search ............................... 353/120, DIG. 3,
353/97, DIG. 5; 40/152, 158 R, 158 B,
159, 362, 366, 704, 701, 709

[56] References Cited

U.S. PATENT DOCUMENTS

| 3,998,535 | 12/1976 | Clarke | 353/DIG. 5 |
|---|---|---|---|
| 4,402,585 | 9/1983 | Garlund | 353/120 |
| 4,632,529 | 12/1986 | Levin | 353/122 |
| 4,688,910 | 8/1987 | Deary | 353/120 |
| 5,013,149 | 5/1991 | Downum et al. | 353/122 |
| 5,319,400 | 6/1994 | Herbert et al. | 353/120 |
| 5,329,324 | 7/1994 | Caudido | 353/120 |
| 5,335,027 | 8/1994 | Lin et al. | 353/120 |
| 5,371,560 | 12/1994 | Kiehne et al. | 353/120 |

FOREIGN PATENT DOCUMENTS 3233257  10/1989  Germany.

*Primary Examiner*—William Dowling
*Attorney, Agent, or Firm*—John Lezdey & Associates

[57] ABSTRACT

This invention relates to an overhead transparency storage and presentation pocket. The pocket has two sheets of material that are welded together along two mutually adjacent edges. Alternatively, the pocket is a folded sheet of material welded along one edge. Attached to the upper or lower sheet is at least one colored and light-permeable or light-dampening flap, which is intended to color the light gap which otherwise normally occurs when presenting an overhead transparency of known standard size with the aid of an overhead projector.

9 Claims, 1 Drawing Sheet

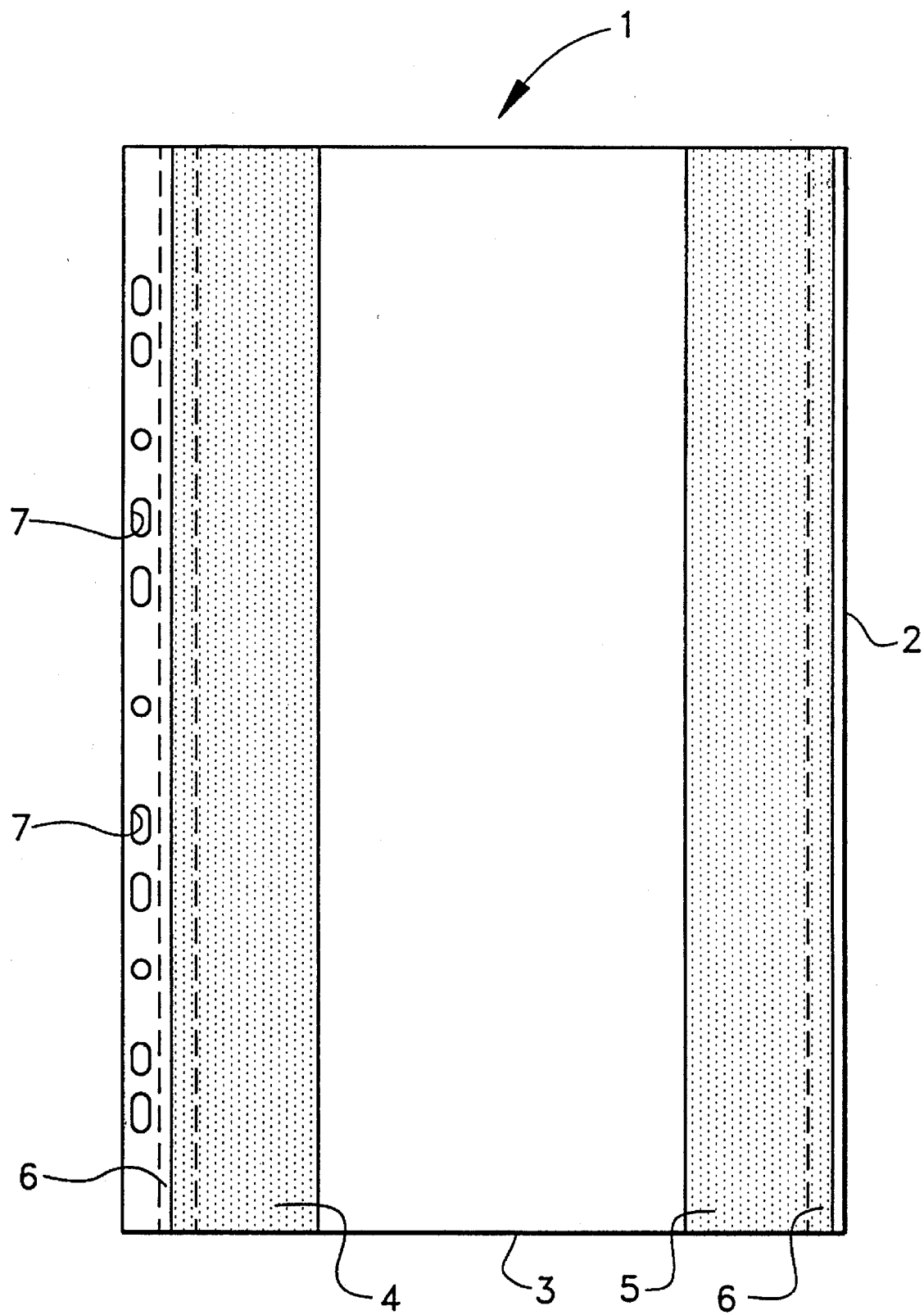

STORAGE AND PROJECTION POCKET FOR OVERHEAD TRANSPARENCIES

BACKGROUND OF THE INVENTION

1. Field of the Invention

The present invention relates to a storage pocket for storing and displaying large diapositives, overhead transparencies or overhead pictures, preferably for storing overhead transparencies whose widths are smaller than the width of the light aperture of a standard overhead projector, wherein the pocket is constructed from a transparent supportive film and a transparent cover film, or from a folded single plastic sheet.

2. Description of the Prior Art

Large diapositives or overhead transparencies are often produced in A4-sizes, i.e. in a rectangular shape which deviates from the square light aperture possessed by standard overhead projectors. Consequently, when the transparency is placed centrally on the light aperture of the overhead projector, a light gap is formed on both sides of the overhead picture, these gaps being shown as two highly illuminated surfaces on both sides of the overhead picture shown on the screen. One method of eliminating these illuminating light gaps has been to use a commercially available plastic pocket provided with outwardly foldable flaps which are intended to cover the light gaps that are formed.

It is often desired by persons who use overhead pictures in conjunction with a presentation or lecture to obtain a neat and attractive framing of the message to be put across, although no suitable solution has hitherto been proposed.

SUMMARY OF THE INVENTION

The object of the present invention is to provide a novel storage and projection pocket for overhead transparencies that can be produced simply and inexpensively and that includes means for framing attractively the message to be put across or conveyed, and also to dampen the light gaps or borders that are formed on both sides of the overhead picture.

The invention will now be described with reference to a non-limiting exemplifying embodiment thereof illustrated in the accompanying drawing.

BRIEF DESCRIPTION OF THE DRAWING

FIG. 1 shows an aerial view of the inventive pocket.

DESCRIPTION OF THE PREFERRED EMBODIMENTS

The drawing illustrates an inventive pocket. The pocket is intended for storing and showing overhead transparencies of known standard size and is translucent so that the transparency need not be removed from the pocket when wishing to project the transparency onto a presentation screen or like surface with the aid of an overhead projector.

According to the invention, the pocket 1 is comprised of a transparent supportive film, for instance made of some suitable plastic material, on which a cover film is welded along two adjacent edges 2, 3 to form a pocket in which known overhead transparencies of standard size can be stored. Alternatively, the pocket 1 may comprise a folded single sheet of material which is welded along one edge to form a pocket. An overhead transparency can thus be inserted into the pocket 1, between the supportive film and the cover film, by bending the cover film away from the supportive film at its free corners, to some slight extent. The pocket is slightly larger than the overhead transparency, so as to accommodate the transparency.

As shown in the drawing, two flaps 4, 5 are mounted along the two long edges of the storage pocket. The two flaps are secured conveniently with the aid of adhesive tape 6 on the upper side or the lower side of the pocket 1, adjacent the two long edges, so as to enable the flaps 4, 5 to be folded out over the two long edges of the pocket 1. The flaps 4, 5 are made of a coloured but light-permeable material, so that when folded out over the long side edges of the pocket, the flaps 4, 5 will provide a coloured frame around the overhead transparency present in the pocket 1. The flaps 4, 5 have a width such that when the flaps 4, 5 are folded out, the pocket will have a generally square shape of the same measurements as the light aperture of a standard overhead projector.

A "negative" print, i.e. a part which does not include the light-permeable colour, can be placed in one or both flaps 4, 5 so as to enable the name or logotype of a company, a trademark or the like to be presented on the screen on one side of the overhead picture. Alternatively, the light-damping flaps 4, 5 can be provided with normal print which reproduces a darker colour on the presentation screen.

At least either the supportive film or the cover film forming the pocket, or the folded sheet from which said pocket is formed, may be provided with a light-permeable pigment or dye to impart toned colouring to the whole of the area presented.

One edge of the illustrated pocket 1 is provided with perforations 7 which enable the pocket to be attached to a folder. In this case, the adhesive tape 6 used to fasten the flap 4 is located immediately inwards of the perforations 7, so that the perforations 7 will not be seen in the coloured frame produced by the flap 4, when the flap 4 is folded out over the edge of the pocket.

It will be understood that the pocket can be constructed for storing overhead transparencies of sizes other than the aforesaid known standard sizes, in which case the sizes of the flaps 4, 5 are adapted accordingly to the sizes concerned.

I claim:

1. An overhead transparency storage and presentation pocket having widths that are smaller than the width of a light aperture on a standard overhead projector, said pocket comprising a transparent supportive film and a transparent cover film mounted on said supportive film, wherein at least one outwardly foldable, and light-permeable flap is disposed along at least one of the longitudinally extending edges of said pocket so as to form a coloured border outside an overhead transparency when said pocket is in a fold-out position.

2. A pocket according to claim 1, wherein flaps are disposed on both longitudinally extending edges of said pocket.

3. A pocket according to claim 1, wherein at least one of said flaps contains a print for reproduction.

4. A pocket according to claim 3, wherein said print is a "negative".

5. A pocket according to claim 1, wherein at least one of said flaps is secured with adhesive tape along a respective long side edge of said pocket.

6. A pocket according to claim 1, said pocket having perforations along one edge and one of said flaps being attached inwardly of said perforations.

7. A pocket according to claim 1, wherein at least one of said supportive film and said cover film includes a light-permeable colourant.

8. A pocket according to claim 1, wherein said flaps are coloured.

9. An overhead transparency storage and presentation pocket having widths that are smaller than the width of a light aperture on a standard overhead projector, said pocket comprising a folded sheet, wherein at least one outwardly foldable, coloured and light-permeable flap is disposed along at least one of the longitudinally extending edges of said pocket so as to form a coloured border outside the overhead transparency when said pocket is in a fold-out position.

* * * * *